United States Patent [19]

Bobsein

[11] Patent Number: 5,144,004

[45] Date of Patent: Sep. 1, 1992

[54] PROCESS FOR PREPARING ARYLENE SULFIDE SULFONE/SULFOXIDE POLYMERS

[75] Inventor: Rex L. Bobsein, Bartlesville, Okla.

[73] Assignee: Phillips Petroleum Company, Bartlesville, Okla.

[21] Appl. No.: 625,244

[22] Filed: Dec. 10, 1990

[51] Int. Cl.$^5$ .................. C08G 75/14; C08G 75/18; C08G 75/20

[52] U.S. Cl. ...................... 528/388; 528/171; 528/174; 528/387; 528/391

[58] Field of Search ............... 528/388, 171, 174, 387, 528/391

[56] References Cited

U.S. PATENT DOCUMENTS

| | | | |
|---|---|---|---|
| 4,008,203 | 2/1977 | Jones | 260/49 |
| 4,051,109 | 9/1977 | Barr et al. | 260/49 |
| 4,232,142 | 11/1980 | Barr et al. | 528/125 |
| 4,495,332 | 1/1985 | Shiiki et al. | 524/609 |
| 4,774,276 | 9/1988 | Bobsein et al. | 524/399 |
| 4,808,698 | 2/1989 | Bobsein et al. | 528/388 |

FOREIGN PATENT DOCUMENTS

3136255A1 3/1983 Fed. Rep. of Germany .

*Primary Examiner*—Harold D. Anderson
*Attorney, Agent, or Firm*—Williams, Phillips, Hitchcock & Carver

[57] ABSTRACT

An arylene sulfide sulfone/sulfoxide polymer and a process for preparing same by contacting at least one dihaloaromatic sulfone, at least one dihaloaromatic sulfoxide, at least one organic amide, at least one sulfur-containing compound, and water.

13 Claims, No Drawings

PROCESS FOR PREPARING ARYLENE SULFIDE SULFONE/SULFOXIDE POLYMERS

BACKGROUND OF THE INVENTION

This invention relates to arylene sulfide sulfone/sulfoxide polymers. In one aspect, this invention relates to phenylene sulfide sulfone/sulfoxide polymers. In another aspect, this invention relates to a process for the production of arylene sulfide sulfone/sulfoxide polymers. In a further aspect, this invention relates to a process for the production of phenylene sulfide sulfone/sulfoxide polymers.

A wide variety of engineering thermoplastics have been prepared, many of which are currently produced and marketed on a moderate to large scale. While such engineering thermoplastics are useful in many areas, one property of such polymers which needs to be improved is the ability to withstand high use temperatures. Engineering thermoplastics frequently form a continuous matrix for reinforcing agents and fillers which are added to alter the properties of the polymers before they are shaped into useful articles such as electrical and automotive parts. Engineering thermoplastics that will withstand high use temperatures alone or in combination with other ingredients are desirable.

Arylene sulfide sulfone polymers are engineering thermoplastics of potential commercial interest for film, fiber, molding, and composite applications because of their high glass transition temperatures and chemical resistance. In some applications, it would be desirable to have an arylene sulfide sulfone polymer which is selectively susceptible to chemical degradation. Incorporation of sulfoxide groups into arylene sulfide sulfone polymers provides a mean for achieving selective chemical degradation of arylene sulfide sulfone polymers without sacrificing the ability of the polymer to withstand high use temperatures.

SUMMARY OF THE INVENTION

It is an object of the invention to provide a process for producing arylene sulfide sulfone/sulfoxide polymers capable of withstanding high use temperatures. It is a further object of the invention to provide an arylene sulfide sulfone/sulfoxide polymer composition capable of withstanding high use temperatures.

According to the invention, a process for preparing arylene sulfide sulfone/sulfoxide polymers is provided which comprises contacting at least one dihaloaromatic sulfone, at least one dihaloaromatic sulfoxide, at least one organic amide, at least one sulfur-containing compound, and water.

Further according to the invention, an arylene sulfide sulfone/sulfoxide polymer composition is provided having arylene sulfide sulfone units and arylene sulfide sulfoxide units, such that the arylene sulfide sulfone/sulfoxide polymer can be characterized as an irregular polymer. As used herein, the term "irregular polymer" is meant to represent a polymer whose molecules cannot be described by only one species of repeating unit in a single sequential arrangement. The polymers produced by the process of the invention include arylene sulfide sulfone and arylene sulfide sulfoxide units in the backbone. These units can be alternating in any sequence and in sequences such that blocks of a repeating unit are present.

DETAILED DESCRIPTION OF THE INVENTION

This invention relates to a process for preparing arylene sulfide sulfone/sulfoxide polymers comprising contacting: (a) at least one dihaloaromatic sulfone, (b) at least one dihaloaromatic sulfoxide, (c) at least one organic amide, (d) at least one sulfur-containing compound, and (e) water. The arylene sulfide sulfone/sulfoxide polymers made according to this invention are readily recoverable and well suited for applications in which such engineering thermoplastics are commonly used.

Dihaloaromatic sulfones employed in the process of the invention can be represented by the formula

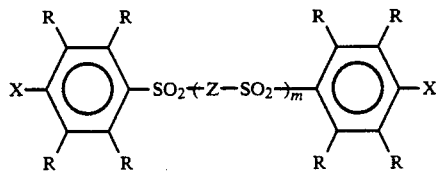

wherein each X is selected from the group consisting of fluorine, chlorine, bromine, and iodine, Z is a divalent radical selected from the group consisting of

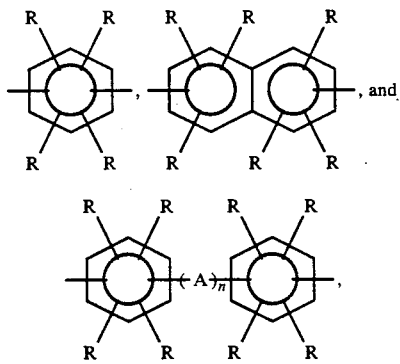

wherein m is 0 or 1, n is 0 or 1, A is selected from the group consisting of oxygen, sulfur, sulfonyl, sulfinyl, and $CR_2$, wherein each R is selected from the group consisting of hydrogen and alkyl radicals having 1 to about 4 carbon atoms, the total number of carbon atoms in all of the R groups in the molecule being 0 to about 12.

Examples of some dihaloaromatic sulfones that can be employed in the process of the invention include bis(4-fluorophenyl)sulfone, bis(4-chlorophenyl)sulfone, bis(4-bromophenyl)sulfone, bis(4-iodophenyl)sulfone, p-chlorophenyl p-bromophenyl sulfone, p-iodophenyl 3-methyl-4-fluorophenyl sulfone, bis(2-methyl-4-chlorophenyl)sulfone, bis(2,5-diethyl-4-bromophenyl)sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenyl sulfone, 1,4-bis(p-chlorophenyl sulfonyl)benzene, 1-methyl-2,4-bis(p-fluorophenyl sulfonyl)benzene, 2,6-bis(p-bromophenyl sulfonyl)naphthalene, 7-ethyl-1,5-bis(p-iodophenyl sulfonyl)naphthalene, 4,4'-bis(p-chlorophenyl sulfonyl)biphenyl, bis[p-(p-bromophenyl sulfonyl)phenyl]ether, bis[p-(p-chlorophenyl sulfonyl)phenyl]sulfide, bis[p-(p- chlorophenyl sulfonyl)phenyl]sulfone, bis[p-(p-bromophenyl sulfonyl)phenyl]methane, 5,5-bis[3-ethyl-4-(p-chlorophenyl sulfonyl)phenyl]nonane, and the like and mixtures thereof. The presently preferred dihaloaromatic sulfone is bis(4-chlorophenyl)sulfone because of its effectiveness and commercial availability.

Dihaloaromatic sulfoxides employed in the process of the invention can be represented by the formula

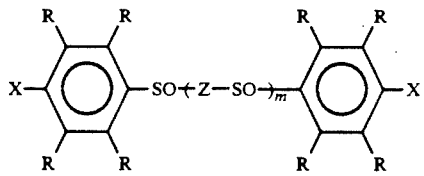

wherein X, R, Z, m, n and A are as defined herein.

Examples of some dihaloaromatic sulfoxides that can be employed in the process of the invention include bis(4-fluorophenyl)-sulfoxide, bis(4-chlorophenyl)sulfoxide, bis(4-bromophenyl)sulfoxide, bis(4-iodophenyl)-sulfoxide, p-chlorophenyl p-bromophenyl sulfoxide, p-iodophenyl 3-methyl-4-fluorophenyl sulfoxide, bis(2-methyl-4-chlorophenyl)sulfoxide, bis(2,5-diethyl-4-bromophenyl)sulfoxide, bis(3-isopropyl-4-iodophenyl)-sulfoxide, bis(2,5-dipropyl-4-chlorophenyl)-sulfoxide, bis(2-butyl-4-fluorophenyl)sulfoxide, bis(2,3,5,6-tetramethyl 4-chlorophenyl)sulfoxide, 2-isobutyl-4-chlorophenyl 3-butyl-4-bromophenyl sulfoxide, 1,4-bis(p-chlorophenyl sulfinyl)benzene, 1-methyl-2,4-bis(p-fluorophenyl sulfinyl)benzene, 2,6-bis(p-bromophenyl sulfinyl)naphthalene, 7-ethyl-1,5-bis(p-iodophenyl sulfinyl)naphthalene, 4,4'-bis(p-chlorophenyl sulfinyl)biphenyl, bis[p-(p-bromophenyl sulfinyl)-phenyl]ether, bis[p-(p-chlorophenyl sulfinyl)phenyl]sulfide, bis[p-(p-chlorophenyl sulfinyl)phenyl]-sulfoxide, bis[p-(p-bromophenyl sulfinyl)phenyl]methane, 5,5-bis[3-ethyl-4-(p-chlorophenyl sulfinyl)phenyl]nonane, and the like and mixtures thereof. The presently preferred dihaloaromatic sulfoxide is bis(4-chlorophenyl)-sulfoxide because of its effectiveness and good results obtained therewith.

The total amount of dihaloaromatic sulfone and dihaloaromatic sulfoxide employed in the invention depends upon the amount of sulfur-containing compound employed. The total amount of dihaloaromatic sulfone and dihaloaromatic sulfoxide can be expressed in terms of a molar ratio of the sum of the dihaloaromatic sulfone and the dihaloaromatic sulfoxide to sulfur-containing compound as defined herein and will generally be about 0.7:1 to about 1.3:1. Preferably, this molar ratio is about 0.9:1 to about 1.15:1.

The amount of dihaloaromatic sulfoxide can be expressed in terms of a molar ratio based on the dihaloaromatic sulfone employed. Generally, the molar ratio of dihaloaromatic sulfoxide to dihaloaromatic sulfone will be about 0.005:1 to about 9:1, preferably about 0.01:1 to about 0.25:1, and most preferably about 0.025:1 to about 0.125:1. Alternately, the amount of dihaloaromatic sulfoxide can be expressed in terms of a mole percent based on the sum of the number of moles of dihaloaromatic sulfone and dihaloaromatic sulfoxide. Generally, the dihaloaromatic sulfoxide is about 0.5 to about 90 mole percent, preferably about 1 to about 20 mole percent, and most preferably about 2.5 to about 11 mole percent of the sum of the number of moles of dihaloaromatic sulfone and dihaloaromatic sulfoxide.

The organic amides used in the process of the invention should be substantially liquid at the reaction temperature and pressure employed. The amides can be cyclic or acyclic and can have 1 to about 10 carbon atoms per molecule. Examples of some suitable organic amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, $\epsilon$-caprolactam, N-methyl-$\epsilon$-caprolactam, N-ethyl-2-pyrrolidone, N-cyclohexyl-2-pyrrolidone, N-dodecyl-3-octyl-2-pyrrolidone, N,N'-ethylene di-2-pyrrolidone, hexamethyl phosphoramide, tetramethylurea, and the like, and mixtures thereof.

The amount of organic amide employed according to the invention can be expressed in terms of molar ratio based on the sulfur-containing compound employed. Broadly, the molar ratio of organic amide to sulfur-containing compound as defined herein will be about 2:1 to about 24:1, preferably about 4:1 to about 16:1. N-methyl-2-pyrrolidone is especially preferred because of excellent results obtained therewith and ready availability.

In accordance with the invention, suitable sulfur-containing compounds which can be employed in the production of the arylene sulfide sulfone/sulfoxide polymers are selected from the group consisting of alkali metal sulfides, alkali metal bisulfides, and hydrogen sulfide. Suitable alkali metal sulfides include lithium sulfide, sodium sulfide, potassium sulfide, rubidium sulfide, cesium sulfide and mixtures thereof. The alkali metal sulfide can be used in anhydrous form, as a hydrate, or as an aqueous mixture. Sodium sulfide is preferred because of ready availability and good results obtained therewith. Suitable alkali metal bisulfides include lithium bisulfide, sodium bisulfide, potassium bisulfide, rubidium bisulfide, cesium bisulfide and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

The amount of water employed according to the invention can be expressed in terms of molar ratio based on the organic amide employed. Broadly, the molar ratio of organic amide to water will be from about 0.4:1 to about 1.6:1, preferably about 0.45:1 to about 1.3:1, and most preferably from about 0.5:1 to about 1.2:1.

In a preferred embodiment, a polymerization modifier such as an alkali metal carboxylate is employed in the process of the invention. Alkali metal carboxylates that can be employed in the process of the invention can be represented by the formula R'CO$_2$M where R' is a hydrocarbyl radical selected from alkyl, cycloalkyl, and aryl and combinations thereof such as alkaryl, aralkyl, and the like, the number of carbon atoms in R' being within the range of 1 to about 20, and M is an alkali metal selected from the group consisting of lithium, sodium, potassium, rubidium and cesium.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyl-octanoate, potassium dodecanoate, rubidium 4-ethyl tetradecanoate, sodium octadecanoate, sodium heneicosanoate, lithium cyclohexane carboxylate, cesium cyclododecane carboxylate, sodium 3-methyl cyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethyl cyclohexylacetate and the like and mixtures thereof. The presently preferred alkali metal carboxylate is sodium acetate because of its effectiveness, economics and commercial availability.

The amount of alkali metal carboxylate employed according to the invention can be expressed in terms of molar ratio based on the sulfur-containing compound employed. Broadly, the molar ratio of alkali metal carboxylate to sulfur-containing compound will be from about 0.002:1 to about 2:1, preferably about 0.05:1 to about 1.1:1, and most preferably about 0.98:1 to about 1.02:1.

In a further preferred embodiment, a base selected from the group consisting of alkali metal hydroxide, alkali metal carbonate, and mixtures of at least one alkali metal hydroxide with at least one alkali metal carbonate is employed when the sulfur-containing compound is an alkali metal bisulfide or hydrogen sulfide.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be used in the process of the invention as an aqueous solution. For example, an aqueous solution of sodium hydroxide having about 50 weight percent sodium hydroxide is convenient to use.

Alkali metal carbonates that can be employed according to the invention include lithium carbonate, sodium carbonate, potassium carbonate, rubidium carbonate, cesium carbonate, and mixtures thereof. Sodium carbonate is preferred because of ready availability and generally good results obtained therewith.

If a mixture of at least one alkali metal hydroxide and at least one alkali metal carbonate is employed, the mixture should contain at least about 5 mole percent alkali metal carbonate. Preferably, the mixture will have about 20 to about 90 mole percent alkali metal carbonate and more preferably about 40 to about 80 mole percent alkali metal carbonate.

When an alkali metal hydroxide is employed, it is convenient to express the amount of alkali metal hydroxide employed in terms of a molar ratio of alkali metal hydroxide to sulfur-containing compound. Broadly, the molar ratio of alkali metal hydroxide to sulfur-containing compound will be from about 0.05:1 to about 4:1, preferably about 0.5:1 to about 2.05:1. Alternately, the amount of alkali metal hydroxide employed can be expressed in terms of a ratio of equivalents of alkali metal hydroxide to moles of sulfur-containing compound. Broadly, the ratio of equivalents of alkali metal hydroxide to moles of sulfur-containing compound will be from about 0.05:1 to about 4:1, preferably about 0.5:1 to about 2.05:1.

When an alkali metal carbonate is employed, it is convenient to express the amount of alkali metal carbonate employed in terms of a molar ratio of alkali metal carbonate to sulfur-containing compound. Broadly, the molar ratio of alkali metal carbonate to sulfur-containing compound will be from about 0.025:1 to about 3:1, preferably about 0.25:1 to about 2:1. Alternately, the amount of alkali metal carbonate employed can be expressed in terms of a ratio of equivalents of alkali metal carbonate to moles of sulfur-containing compound. Broadly, the ratio of equivalents of alkali metal carbonate to moles of sulfur-containing compound will be from about 0.05:1 to about 6:1, preferably about 0.5:1 to about 4:1.

When a mixture of at least one alkali metal hydroxide and at least one alkali metal carbonate is employed, it is convenient to express the amount of total base in terms of a ratio of equivalents of base to moles of sulfur-containing compound since one mole of alkali metal hydroxide corresponds to one equivalent of alkali metal hydroxide while one mole of alkali metal carbonate corresponds to two equivalents of alkali metal carbonate. Broadly the ratio of equivalents of total base to moles of sulfur-containing compound will be from about 0.05:1 to about 6:1, preferably about 0.5:1 to about 4:1.

The charge sequence of the various compounds employed in the process of the invention can be varied as desired. One convenient method is to simply charge all the compounds in any desired sequence to a suitable reaction vessel equipped with agitation means at about room temperature and then to heat the mixture with stirring to the desired reaction temperature and to hold the mixture for the desired length of time at the reaction temperature. It is also possible to preheat a mixture of only certain of the compounds in a separate vessel then to charge this mixture to a preheated mixture of the remainder of the compounds in the reaction vessel. For example, an organic amide can be pre-reacted with an alkali metal hydroxide in the presence of water, and this mixture subsequently contacted with the sulfur-containing compound to form a complex comprising these components. The complex is then utilized to contact the dihaloaromatic sulfone and the dihaloaromatic sulfoxide under suitable polymerization conditions to produce the arylene sulfide sulfone/sulfoxide polymer. Although the reaction temperature at which the polymerization is conducted can vary over a considerable range, generally it will be within the range of about 140° C. to about 240° C., preferably about 185° C. to about 225° C. The reaction time can vary widely, depending in part on the reaction temperature employed, but generally will be within the range of about 10 minutes to about 72 hours, preferably about 1 hour to about 4 hours. The pressure should be sufficient to maintain the dihaloaromatic sulfone, the dihaloaromatic sulfoxide, and other organic compounds present substantially in the liquid phase.

The arylene sulfide sulfone/sulfoxide polymers produced by the process of the invention are in particle form and can be separated from the reaction mixture by conventional procedures, e.g. by filtration of the reaction mixture to recover the polymer followed by washing at least once with water. An alternative recovery method involves diluting the hot reaction mixture with a mixture of water and organic amide and cooling the diluted mixture while stirring. The separated polymer particles can then be washed with water preferably with at least a portion of the washing being conducted at an elevated temperature within the range of about 130° C. to about 250° C. and then dried to provide a polymer which is low in ash-forming substances and is relatively light in color as well as exhibiting good melt flow stability under conditions of melt processing operations such as injection molding. In addition, it is presently preferred to employ a zinc carboxylate salt in the treatment of the recovered arylene sulfide sulfone/sulfoxide polymer in at least one of the above-described washing steps to improve the melt flow stability of the polymer. Such a process for treating with a zinc carboxylate salt is described in U.S. Pat. No. 4,774,276 which is hereby incorporated by reference herein. If the arylene sulfide sulfone/sulfoxide polymer is treated with a zinc carboxylate salt as described above, it is further preferred that the arylene sulfide sulfone/sulfoxide polymer be further treated with an organic acid, particularly acetic acid, during at least one of the above-described washing steps.

The arylene sulfide sulfone/sulfoxide polymers produced by the process of this invention can be characterized as irregular polymers, the molecules of which cannot be described by only one species of repeating unit in a single sequential arrangement. The irregular polymers can be characterized as having at least the units within the polymer backbone represented by the following structural formulas:

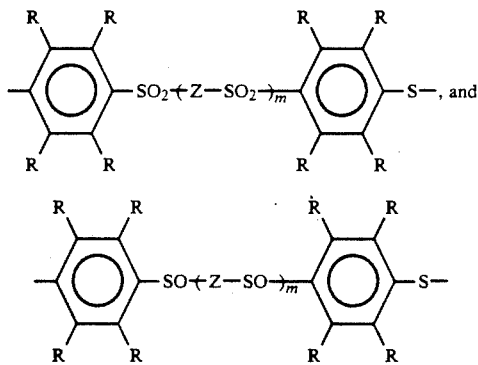

wherein R, Z, and m are as defined herein. The arylene sulfide sulfone/sulfoxide polymers can also have minor amounts of other structural groups present, particularly at the polymer end groups. The preferred arylene sulfide sulfone/sulfoxide polymer can be characterized as having at least the units within the polymer backbone represented by the following structural formulas:

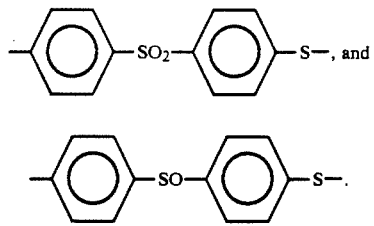

The amount of structural units of arylene sulfide sulfoxide in the polymer can be expressed in terms of a percent based on the sum of the number of units of the arylene sulfide sulfone and the number of units of the arylene sulfide sulfoxide. Generally, the amount of units of arylene sulfide sulfoxide is about 0.5 to about 90 percent, preferably about 1 to about 20 percent, and most preferably about 2.5 to about 11 percent of the sum of the number of units of arylene sulfide sulfone and the number of units of arylene sulfide sulfoxide.

The arylene sulfide sulfone/sulfoxide polymers prepared according to this invention generally exhibit an inherent viscosity at least about 0.2 dL/g, preferably from about 0.24 to about 0.5 dL/g. Inherent viscosity is a measurement of molecular weight which is particularly useful in characterizing arylene sulfide sulfone/sulfoxide polymers. As used herein, the term "inherent viscosity" (I.V.) refers to dilute solution viscosity which is the ratio of the natural logarithm of the relative viscosity to the polymer solution concentration in grams per deciliter (g/dL). The relative viscosity is the ratio of the flow time of a specific solution of the polymer to the flow time of the pure solvent. Inherent viscosities for arylene sulfide sulfone/sulfoxide polymers are measured generally according to the method described in ASTM D 1243-79 wherein samples of dried polymer are dissolved in N-methyl-2-pyrrolidone at 30° C. at a polymer concentration of 0.5 grams per deciliter utilizing a No. 100 Cannon-Fenske viscometer.

The arylene sulfide sulfone/sulfoxide polymer as produced by the process of the invention can be blended with fillers, fibers, pigments, extenders, other polymers and the like. The arylene sulfide sulfone/sulfoxide polymers of the invention are useful in the production of film, fibers, molded objects, coatings and composites.

The arylene sulfide sulfone/sulfoxide polymers of the invention can be employed as the continuous matrix in continuous long fiber reinforced compositions such as prepregs, laminates and pultruded shapes. Such fiber reinforced compositions can be prepared by any method known to those of ordinary skill in the art.

EXAMPLES

In the following examples, the polymer inherent viscosity (I.V.) in units of deciliters per gram (dL/g) were determined according to the method of ASTM D 1243-79 wherein samples of dried polymer were dissolved in N-methyl-2-pyrrolidone (NMP) at 30° C. at a polymer concentration of 0.5 g/dL utilizing a No. 100 Cannon-Fenske viscometer.

Polymer melt flow rates (MF) were determined according to the method of ASTM D 1238, Condition 317/5.0, modified to employ a 5 minute preheat. Polymer glass transition temperatures (Tg) were determined on a Perkin-Elmer differential scanning calorimeter, Model DSC-2, with a nitrogen atmosphere and a heating rate of 20° C. per minute.

Elemental analyses were carried out using sample combustion for carbon, hydrogen, nitrogen, and sulfur and neutron activation for chlorine and oxygen.

EXAMPLE 1

A poly(phenylene sulfide sulfone/sulfoxide) was prepared in polymerization run 1 in a 7.6-liter, stirrer equipped Hastalloy C autoclave. The autoclave was charged with 1.35 g-mol bis(4-chlorophenyl) sulfone (BCPS), 1.5 g-mol sodium acetate (NaOAc), 3.0 g-mol sodium carbonate (Na$_2$CO$_3$), 12.0 g-mol NMP, 1.50 g-mol sodium hydrosulfide (NaSH) as a 59.6 weight percent aqueous solution, 10.20 g-mol water, and 0.15 g-mol bis(4-chlorophenyl) sulfoxide. After the autoclave had been closed, heating and stirring were initiated and the autoclave was purged with nitrogen. The autoclave temperature was increased to 200° C. and maintained for three hours.

The particles recovered from the cooled autoclave were washed with hot water (approx. 70°-90° C.) until the filtrate was clear to produce a polymer with a Tg of 203° C. and an I.V. of 0.24 dL/g. A melt flow rate of 131.5 g/10 min was determined at 317° C.

An elemental analysis of the polymer gave C, 58.91; H, 3.27; N, 0.00; S, 25.5; O, 13.44; Cl, 0.31 weight percent. The calculated values for a poly(phenylene sulfide sulfone/sulfoxide) expected from the monomers used are C, 58.42; H, 3.27; N, 0.00; S, 25.99; O, 12.32; Cl, 0.00 weight percent.

EXAMPLE 2

Control polymerization run 2 was carried out to show that formation of a poly(phenylene sulfide sulfoxide) under the conditions used in Example 1 is difficult.

An autoclave was charged with 0.374 g-mol NaSH as an aqueous mixture containing 59.8 weight percent NaSH, 0.375 g-mol NaOAc, 0.75 g-mol Na₂CO₃, 2.56 g-mol water, 3.00 g-mol NMP, and 0.375 g-mol bis(4-chlorophenyl)sulfoxide. This run used a ratio of sulfoxide monomer to NaSH of 1.0025/1. After the autoclave had been closed, the heaters and stirrer were started and the autoclave purged with nitrogen. The autoclave was heated to 200° C. and held for three hours.

When the autoclave was cooled and opened, the product was a low molecular weight material with a foul smell.

Control run 3 was carried out in a manner similar to that described for run 2 except that a slightly larger excess of the bis(4-chloro-phenyl) sulfoxide to NaSH (1.010/1) was used. The product of this reaction was also a low molecular weight material with a foul smell.

EXAMPLE 3

Several additional polymerization runs were carried out to demonstrate the wide range of polymerization and washing conditions that can be employed to produce the poly(phenylene sulfide sulfone/sulfoxide) of this invention.

In run 4, a 3.8 liter, stirrer-equipped autoclave was charged with 0.91 g-mol BCPS, 0.11 g-mol bis(4-chlorophenyl)sulfoxide, 1.0 g-mol NaSH as an aqueous mixture containing 58.7 weight percent NaSH, 1.0 g-mol NaOH, 0.04 g-mol NaOAc, and 8 g-mol NMP. The closed autoclave was stirred, purged with nitrogen, and heated to 200° C. When the temperature reached 200° C., 6.4 g-mol of distilled water was added slowly to the reactor. At the end of four hours at 200° C., the heat was terminated and 350 mL of NMP and 125 mL of distilled water were added to the reactor.

After the reactor had cooled to 125° C., the autoclave was opened and the product removed. A granular polymer was recovered from the product mixture with a 100 mesh screen and was washed and rinsed with distilled water and dried. The polymer was recovered in a 95 mole percent yield and had an I.V. of 0.26 dL/g.

Several other polymerization runs were carried out in a manner similar to that described in run 4. The changes in quantities of materials for each run and the product I.V. values are summarized in Table I. Water listed in Table I indicates water charged initially to the autoclave. When water was charged initially, no additional water was charged at 200° C.

TABLE I

| | Poly(phenylene sulfide sulfone/sulfoxide) | | | | | | |
|---|---|---|---|---|---|---|---|
| Run | BCPS, g-mol | Sulf-oxide, g-mol | NaOH, g-mol | Na₂CO₃, g-mol | NaOAc, g-mol | H₂O, g-mol | I.V., dL/g |
| 4 | 0.91 | 0.11 | 1.0 | 0.0 | 0.04 | 0.0 | 0.26 |

TABLE I-continued

| | Poly(phenylene sulfide sulfone/sulfoxide) | | | | | | |
|---|---|---|---|---|---|---|---|
| Run | BCPS, g-mol | Sulf-oxide, g-mol | NaOH, g-mol | Na₂CO₃, g-mol | NaOAc, g-mol | H₂O, g-mol | I.V., dL/g |
| 5 | 0.96 | 0.05 | 1.0 | 0.0 | 0.04 | 0.0 | 0.32 |
| 6 | 0.96 | 0.05 | 1.0 | 0.0 | 0.04 | 0.0 | 0.27 |
| 7 | 0.96 | 0.05 | 1.0 | 0.0 | 0.04 | 5.0 | 0.26 |
| 8 | 0.96 | 0.05 | 0.0 | 1.0 | 1.0 | 0.0 | 0.30 |
| 9 | 0.96 | 0.05 | 0.0 | 1.0 | 1.0 | 6.4 | 0.30 |
| 10 | 0.95 | 0.05 | 0.75 | 0.25 | 1.0 | 0.0 | 0.31 |
| 11 | 0.97 | 0.05 | 1.0 | 0.0 | 0.05 | 0.0 | 0.28 |
| 12 | 0.98 | 0.03 | 1.0 | 0.0 | 0.04 | 0.0 | 0.32 |
| 13 | 0.98 | 0.03 | 0.75 | 0.25 | 1.0 | 6.4 | 0.30 |

Variations in the base and in quantities of several of the chemicals in the polymerizations were made without severe changes in the polymer.

EXAMPLE 4

Several polymerizations were carried out on a larger scale to further demonstrate variations in the preparation of the phenylene sufide sulfone/sulfoxide polymers of the present invention. Polymerization run 14 was carried out in a 3.8-liter, stirred autoclave. The autoclave was charged with 2.0 g-mol NaSH as an aqueous mixture containing 58.7 weight percent NaSH, 1.96 g-mol BCPS, 0.06 g-mol bis(4-chlorophenyl)sulfoxide, 2.0 g-mol NaOH, 2.0 g-mol NaOAc, and 14 g-mol NMP. After the autoclave had been closed and the stirrer started, it was purged with nitrogen and heated to 200° C. At 200° C., 12.8 g-mol distilled water was added and the mixture heated for three hours. At the end of the three hour heating time, the heat was terminated and 300 mL NMP and 100 mL distilled water were added to the autoclave. The autoclave was slowly cooled to 125° C. and then opened. After the autoclave contents had been removed and filtered on a 100 mesh screen, the polymer was washed and rinsed with distilled water and then dried. The product was recovered in a 94 mole percent yield and had an I.V. of 0.36 dL/g.

Several other polymerization runs were carried out using the procedure described in run 14 with variations in the amounts of the ingredients. In run 18, the polymerization time was four hours. The results of these polymerization runs are summarized in Table III.

TABLE III

| | Poly(phenylene sulfide sulfone/sulfide | | | |
|---|---|---|---|---|
| Run | BCPS, g-mol | Sulfoxide, g-mol | NaOAc, g-mol | I.V., dL/g |
| 14 | 1.96 | 0.06 | 2.0 | 0.36 |
| 15 | 1.92 | 0.10 | 2.0 | 0.31 |
| 16 | 1.91 | 0.10 | 2.0 | 0.32 |
| 17 | 1.91 | 0.10 | 0.08 | 0.29 |
| 18 | 1.90 | 0.10 | 0.08 | 0.27 |

That which is claimed is:

1. A process for producing an arylene sulfide sulfone/sulfoxide polymer comprising contacting: (a) at least one dihaloaromatic sulfone, (b) at least one dihaloaromatic sulfoxide, (c) at least one organic amide, (d) at least one sulfur-containing compound selected from the group consisting of alkali metal sulfides, alkali metal bisulfides and hydrogen sulfide, and (e) water.

2. A process according to claim 1 wherein said dihaloaromatic sulfone is represented by the formula

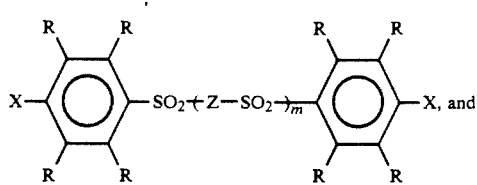

said dihaloaromatic sulfoxide is represented by the formula

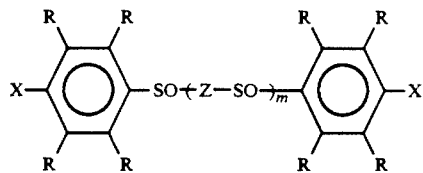

wherein each X is selected from the group consisting of fluorine, chlorine, bromine and iodine, Z is a divalent radical selected from the group consisting of

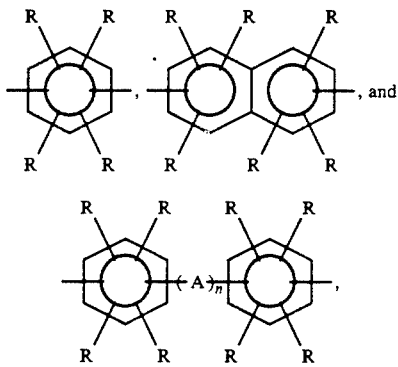

m is 0 or 1, n is 0 or 1, A is selected from the group consisting of oxygen, sulfur, sulfonyl, sulfinyl, and $CR_2$, wherein each R is selected from the group consisting of hydrogen and alkyl radicals having 1 to about 4 carbon atoms, the total number of carbon atoms in all of the R groups in the molecule being 0 to 12.

3. A process according to claim 2 wherein the molar ratio of said dihaloaromatic sulfoxide to said dihaloaromatic sulfone is about 0.005:1 to about 9:1.

4. A process according to claim 3 wherein the molar ratio of the sum of said dihaloaromatic sulfone and said dihaloaromatic sulfoxide to said sulfur-containing compound is about 0.7:1 to about 1.3:1, the molar ratio of said organic amide to said sulfur-containing compound is about 2:1 to about 24:1, and the molar ratio of said organic amide to said water is about 0.4:1 to about 1.6:1.

5. A process according to claim 4 wherein said organic amide is selected from the group consisting of cyclic and acyclic organic amides having 1 to about 10 carbon atoms per molecule.

6. A process according to claim 5 further comprising an alkali metal carboxylate having the formula $R'CO_2M$ wherein R' is a hydrocarbyl radical containing 1 to about 20 carbon atoms and M is an alkali metal.

7. A process according to claim 6 further comprising a base selected from the group consisting of alkali metal hydroxide, alkali metal carbonate and mixtures of at least one alkali metal hydroxide with at least one alkali metal carbonate.

8. A process according to claim 7 wherein said dihaloaromatic sulfone is bis(4-chlorophenyl)sulfone and said dihaloaromatic sulfoxide is bis(4-chlorophenyl)sulfoxide.

9. A process according to claim 8 wherein the molar ratio of said dihaloaromatic sulfoxide to said dihaloaromatic sulfone is about 0.01:1 to about 0.25:1.

10. A process for the production of a phenylene sulfide sulfone/sulfoxide polymer comprising contacting: (a) bis(4-chlorophenyl)sulfone, (b) bis(4-chlorophenyl)-sulfoxide, (c) N-methyl-2-pyrrolidone, (d) sodium bisulfide, (e) a base selected from the group consisting of sodium hydroxide, sodium carbonate, and mixtures of sodium hydroxide and sodium carbonate, and (f) water, wherein the molar ratio of said bis(4-chlorophenyl)sulfoxide to said bis(4-chlorophenyl)sulfone is about 0.025:1 to about 0.125:1.

11. An arylene sulfide sulfone/sulfoxide polymer composition comprising units having the structure

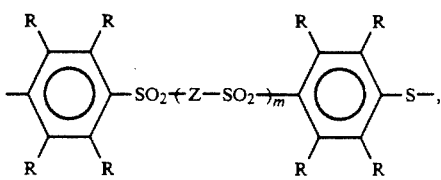

and units having the structure

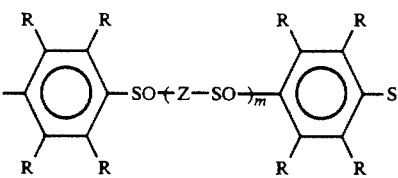

wherein Z is a divalent radical selected from the group consisting of

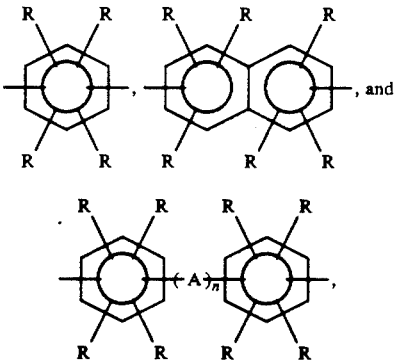

m is 0 or 1, n is 0 or 1, A is selected from the group consisting of oxygen, sulfur, sulfonyl, sulfinyl, and $CR_2$, wherein each R is selected from the group consisting of hydrogen and alkyl radicals having 1 to about 4 carbon atoms, the total number of carbon atoms in all of the R groups in the repeat unit being 0 to about 12.

12. An arylene sulfide sulfone/sulfoxide polymer composition according to claim 11 wherein the inherent viscosity of said arylene sulfide sulfone/sulfoxide polymer is at least about 0.2 dL/g when measured according to ASTM D 1243-79, in N-methyl-2-pyrrolidone at a temperature of 30° C. with a polymer concentration of 0.5 g/dL.
13. An arylene sulfide sulfone/sulfoxide polymer composition according to claim 12 wherein said R is hydrogen and said m is 0 comprising units having the structure
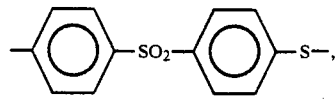
and units having the structure
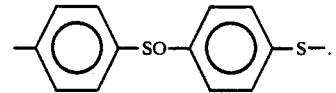
* * * * *